May 29, 1956 A. A. STEINER 2,747,331
HYDROPONICS

Filed July 2, 1952

INVENTOR.
Abram Arie Steiner
BY
Michael S. Striker
Agent United States Patent Office 2,747,331

Patented May 29, 1956

2,747,331
HYDROPONICS

Abram Arie Steiner, The Hague, Netherlands, assignor to De Nederlandse Centrale Organisatie Voor Toegepast Natuurwetenschappelijk Onderzoek, The Hague, Netherlands, a corporation of the Netherlands Application July 2, 1952, Serial No. 296,799

13 Claims. (Cl. 47—1.2)

The invention relates generally to the art of plant culture known as hydroponics.

More particularly the invention relates to a system of hydroponics in which use is made of a culture bed having a bottom which is practically impervious to water and aqueous solutions, carrying the inorganic nutrients for feeding the plants.

The nutrient substances are known as such and they are used in such composition and such dilution as is desirable by the specific type of plants to be grown.

So, for instance, a solution for growing carnations may consist of:

| | | |
|---|---|---|
| $Ca(NO_3)_2.4$ aq. | kg | 2.5 |
| $MgSO_4.7$ aq. | kg | 0.5 |
| $KH_2PO_4$ | kg | 0.3 |
| $K_2SO_4$ | kg | 0.5 |
| Tap water | ltr | 1000 |

The invention is not limited to the use of the above mentioned solutions as a large number of other compositions are known in the art and may be applied with a favourable result.

The measures to be taken according to the present invention relate more specifically to a system of hydroponics in which the nutrient solution is contacted discontinuously with the roots of the plants, e. g. once in two or three days or one, two, three, ten times or more daily.

The period of contacting may vary from several minutes to half an hour or an hour or even more.

For the feeding in the present type of hydroponics a nutrient solution is interruptedly passed through a gravel-bed in which the roots of the plants are growing. Instead of gravel also another kind of inert material may be used such as pumice-stone, coke, glass fragments, glass wool, etc., as this material only serves to support the roots of the plants. Any other supporting system may also be used. In the following the word "gravel" is meant to comprise also the other possibilities.

Heretofore in hydroponics too little attention has been paid to the important advantage which can be obtained when the space in which the roots of the plants are present is kept at a suitable temperature.

By maintaining a suitable temperature in this space a better development of the roots and the further parts of the plants will be ensured than in the case of the roots being subjected to the cooling effect of the bottom between the feeding periods. Heating of the bed by means of heating elements, for instance electric resistance wires or warm water conduit pipes, located in the gravel, as known in the so-called sand-cultures, or under the bottom of the bed could overcome this difficulty but has the disadvantage of being expensive.

It is evident that by the discontinuous passing of the nutrient solution through the gravel bed no continuous heating of the space in which the roots of the plants are present, by means of the nutrient solution itself will be possible. Only when a nutrient solution is continuously passed through the space in which the roots are present, a satisfactory heating of this space by means of the nutrient solution may be attained such as in the United States Patent 2,062,755.

A discontinuous supply of nutrient solution, however, has many advantages, for instance with regard to supplying the roots of the plants with sufficient oxygen and to the efficiency of the system as a whole as well as to the power consumption, as was proved by the applicant over a period of several years.

A more specific object of the invention is to provide a system for discontinuously feeding nutrient solution to the roots of the plants in a gravel culture besides heating continuously the space in which the roots of these plants are present, by means of the nutrient solution.

Other objects will hereinafter appear in the description and claims.

In the annexed drawing some embodiments of the invention are shown.

Figure 1:
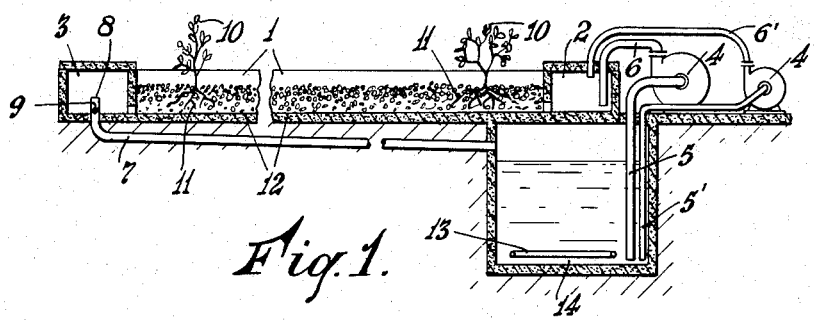
Fig. 1 represents in a sectional view a gravel culture installation in which nutrient solution is discontinuously brought into the bed to such a level that substantially only the roots extend in said nutrient solution during said feeding.

The preferred gravel culture installation of Fig. 1 comprises a culture bed 1, having a water-impervious bottom 12, in which bed the plants 10 are growing with their roots 11 supported by a layer of gravel filling the whole depth of the bed down to the bottom or being separated from the bottom by being placed on a grid or mesh screen at some distance, for instance one to five centimetres or more or less, from the bottom 12 of the bed.

The installation is provided with an inlet gutter 2 and an outlet gutter 3 at opposite sides of the bed, a sump 14 which may be located under the whole or part of the bed, a pump 4 for discontinuously feeding nutrient solution from the sump 14 through the conduits 5 and 6 to the inlet gutter 2, said pump being controlled for instance by a time switch by which the feeding period can be adjusted and varied.

During a certain period, as stated above, said nutrient solution is kept in the gravel bed at the desired level for feeding the root system 11 of the plants 10 by the suitably adjusted wide overflow 8. The overflowing liquid is discharged through the conduit 7 back to the sump 14. Another pump 4′ continuously draws nutrient solution from the sump 14 through the conduits 5′ and 6′ to the inlet gutter 2. This continuously supplied nutrient solution forms a layer continuously flowing over the bottom 12 of the bed 1 and being continuously discharged through the opening 9 in the overflow 8 through the conduit 7 back to sump 14. This layer is substantially thinner than the discontinuously fed layer and will as a rule remain below the roots 11 of the plants 10.

The thickness of the continuous layer, in relation to its temperature and linear velocity, depends on the number of calories needed for maintaining a suitable temperature in the region of the roots of the plants. In practice the thickness may be some centimetres or less than one centimetre or even five centimetres or more. It should be borne in mind, however, that many plants do not grow well if the lower parts of the root system permanently contact the flowing layer of nutrient solution.

As the outlet opening 9 is chosen in such a way that it has a capacity to discharge somewhat more nutrient solution from said bed per time unit than the continuously supplied quantity, the discontinuously supplied liquid will gradually be drained by this outlet opening 9 when the pump 4 and the overflow 8 are out of action, thus leaving the continuously flowing solution in the bed. Evidently this draining can also be effected in any other way, known as such, for instance by a supplemental discharge opening such as a leakhole, another small overflow in the outlet gutter or even in another place of the installation.

A heating element 13 which may be of any suitable type, such as the electrically or steam heated or water heated type, controlled by for instance a thermostat located preferably in the sump 14, can be used in order to maintain a given desired temperature in the nutrient solution.

It may be of advantage to insulate the beds and/or further parts of the installation from the heat which otherwise would be conveyed to the surroundings in which they are placed.

Figure 2:
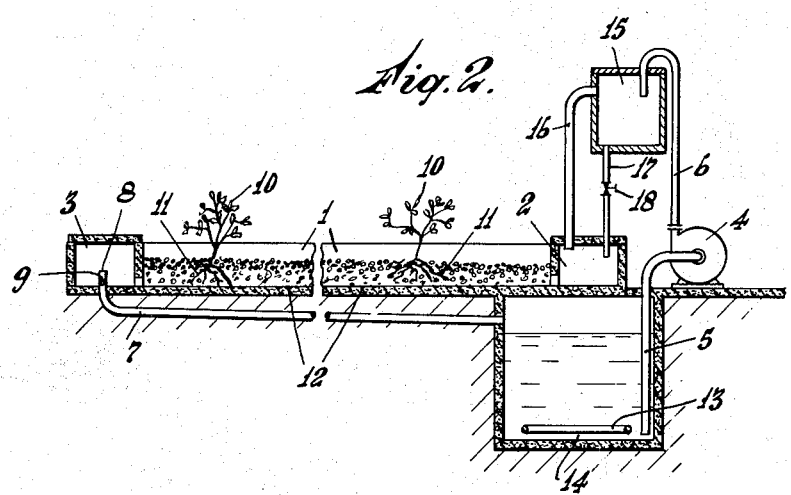
Fig. 2 represents in a sectional view another embodiment of the invention.

The gravel culture installation given in Fig. 2 comprises a culture bed 1 in which the plants 10 are growing with their roots 11 in a gravel layer filling the whole depth of the bed down to the bottom or being placed on a grid or mesh screen spaced from the bottom 12 of the bed. The installation is provided with an inlet gutter 2 and an outlet gutter 3 at opposite sides of the bed, a sump 14 which can conveniently be located under the whole or part of the bed, a pump 4 for discontinuously drawing nutrient solution from the sump 14 through the conduits 5 and 6 to the preferably heat insulated tank 15 mounted above bed 1. This tank has a capacity to receive a quantity of nutrient solution from said pump 4 during its discontinuous action, sufficient to maintain a continuous flowing layer over the bottom 12 of the bed 10 between the discontinuous feeding periods. During the discontinuous feeding period of pump 4 the quantity of nutrient solution introduced into said tank 15 is so large that sufficient nutrient solution flows through conduits 16 to fill up the culture bed to a desired level, this layer being kept in the bed for some time by means of the outlets 8 and 9 as described with reference to Fig. 1. The conduit 17 may be provided with a controlling device 18 by which the continuous flow can be regulated.

It is possible to give tank 15 a smaller capacity than necessary to maintain the thin continuous layer in the bed during the periods between the discontinuous feeding.

Figure 3:
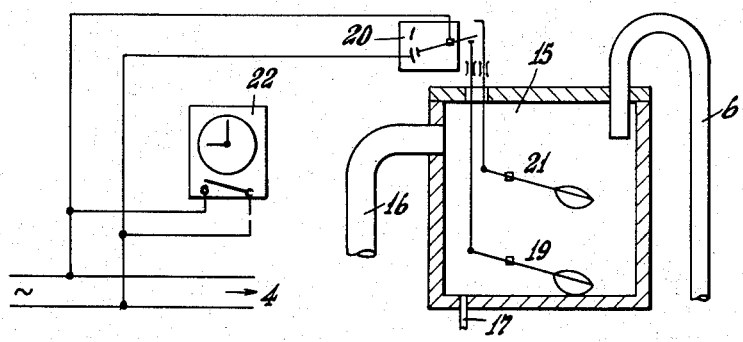
Fig. 3 represents schematically on an enlarged scale, another embodiment of the tank 15 of Fig. 2 according to the invention.

For this purpose a float 19 may be placed in tank 15, such as shown in Fig. 3, which float starts pump 4, having a relatively great capacity, by means of switch 20 as soon as the liquid level in tank 15 has fallen to some centimetres above the bottom. Now tank 15 is being filled with nutrient solution from sump 14 by means of pump 4 via conduit 6.

Just before the liquid level in tank 15 is reaching the lower parts of the outlet 16 the switch 20 is reversed by float 21, causing pump 4 to stop.

For discontinuous feeding of the culture bed, pump 4 is started by means of time switch 22, causing pump 4 to continue operating even after the moment that the liquid level in tank 14 has risen so high that float 21 reverses switch 20 with the result that the discontinuous feeding of the culture bed takes place via conduit 16 until time switch 22 cuts off the electric current to pump 4.

In practice several deviations from the constructions described in the above may be resorted to as do not form a departure from the spirit of the invention as defined by the following claims.

I claim:

1. In an installation for hydroponics, a culture bed having a water-impervious bottom, means for introducing a flowing layer of nutrient solution discontinuously at one side into said bed to a desired level, means for removing said flowing layer of nutrient solution at the opposite side of said bed, means for maintaining a substantially thinner continuously flowing layer of nutrient solution on the bottom of said bed, and means for maintaining both layers of nutrient solution at a desired temperature.

2. In an installation for hydroponics, a culture bed having a water-impervious bottom, a sump for storing nutrient solution, a pump for feeding said nutrient solution discontinuously to one side of the bed, means for extracting and draining said nutrient solution at the other side of the bed while maintaining a layer of nutrient solution contacting the root system of the plants in cultivation during a desired period of time, means for starting and stopping said pump at chosen intervals, a second pump and means for maintaining permanently a substantially thinner layer of said nutrient solution flowing over the bottom of said bed, which latter layer may only contact a negligible part of the root system of the plants in cultivation, means for returning the nutrient solution of both layers to the sump, and means for maintaining the nutrient solution at a desired temperature.

3. In an installation for hydroponics comprising a culture bed having a water-impervious bottom and a sump for storing nutrient solution, a pump for feeding said nutrient solution discontinuously to one side of the bed, an overflow for extracting said nutrient solution at the other side of the bed while maintaining a layer of nutrient solution contacting the root system of the plants in cultivation during a desired period of time, a leakhole for draining said nutrient solution after said desired period of time, means for starting and stopping said pump at desired intervals, a second pump and means for maintaining permanently a substantially thinner layer of said nutrient solution flowing over the bottom of said bed, which latter layer may only contact a negligible part of the root system of the plants in cultivation, means for returning the nutrient solution of both layers to the sump, and means for maintaining the nutrient solution at a desired temperature.

4. In an installation for hydroponics comprising a culture bed having a water-impervious bottom and a sump for storing nutrient solution, a pump for feeding said nutrient solution discontinuously to one side of the bed, an overflow for extracting said nutrient solution at the other side of the bed while maintaining a layer of nutrient solution contacting the root system of the plants in cultivation during a desired period of time, a leakhole for draining said nutrient solution after said desired period of time, means for starting and stopping said pump at desired intervals, a second pump and means, being combined with said leakhole for maintaining permanently a substantially thinner layer of said nutrient solution flowing over the bottom of said bed, which latter layer may only contact a negligible part of the root system of the plants in cultivation, means for returning the nutrient solution of both layers to the sump, and means for maintaining the nutrient solution at a desired temperature.

5. In an installation for hydroponics comprising a culture bed having a water-impervious bottom and a sump for storing nutrient solution, a tank positioned above said bed, a pump for feeding nutrient solution discontinuously from said sump to said tank, means for starting and stopping said pump at desired intervals, said tank having a first outlet opening at its bottom for maintaining permanently a relatively small flowing layer of nutrient solution on the bottom of said bed which layer may only contact a negligible part of the root system of the plants in cultivation, means for discharging said nutrient solution of said flowing permanent layer at the side of the bed opposite to its inflow, said tank having also a second outlet opening at a certain height above the first outlet opening, for discontinuously feeding more nutrient solution to the bed at one side of said bed, means for extracting and draining said discontinuously fed nutrient solution at the other side of said bed while maintaining the total level of the nutrient solution in said bed such that it contacts the root system of the plants in cultivation during a desired period of time, means for returning the nutrient solution of both layers to the sump and means for maintaining the nutrient solution at a desired temperature.

6. In an installation for hydroponics, comprising a culture bed having a water-impervious bottom and a sump for storing nutrient solution, a tank positioned above said bed, a pump for feeding nutrient solution discontinuously from said sump to said tank, said tank having a first outlet opening at its bottom for maintaining a relatively small flowing layer of nutrient solution on the bottom of said bed, which layer may only contact a neglibigle part of the root system of the plants in cultivation, means for discharging said nutrient solution of said flowing layer at the other side of the bed, said tank having also a second outlet opening at a certain height above the first outlet opening for discontinuosly feeding more nutrient solution to the bed at one side of said bed, means for extracting and draining said discontinuously fed nutrient solution at the other side of said bed, while maintaining the total level of the nutrient solution in said bed such that it contacts the root system of the plants in cultivation during a desired period of time, means for returning the nutrient solution of both layers to the sump, first means for starting the pump when the level of the nutrient solution in said tank is at a minimum, second means for stopping the pump during the period in which only said relatively small flowing layer has to be present on the bottom of said bed, when the level of the nutrient solution in said tank is at a maximum, said maximum being below the second outlet opening of said tank, third means for periodically starting and stopping the pump independent from said first and second means, and means for maintaining the nutrient solution at a desired temperature.

7. In a hydroponics system, in combination, container means having a bottom and a culture bed extending along said bottom, said container means being adapted to have plants arranged therein with their roots extending into said culture bed; continuous liquid supply means for providing a continuously flowing layer of nutrient solution along the bottom of said container means; intermittent liquid supply means for increasing the amount of nutrient solution supplied to said container means for intermittently raising the level of the nutrient solution therein; and heating means for maintaining the nutrient solution at a predetermined temperature, whereby the plant roots may be discontinuously immersed in nutrient solution while a predetermined temperature is continuously maintained in said culture bed of said container means.

8. In a hydroponics system, in combination, container means having a bottom and a culture bed extending along said bottom, said container means being adapted to have plants arranged therein with their roots extending into said culture bed; continuous liquid supply means including a continuously operable pump for providing a continuously flowing layer of nutrient solution along the bottom of said container means; intermittent liquid supply means including an intermittently operable pump for increasing the amount of nutrient solution supplied to said container means for intermittently raising the level of the nutrient solution therein; and heating means for maintaining the nutrient solution at a predetermined temperature, whereby the plant roots may be discontinously immersed in nutrient solution while a predetermined temperature is continuously maintained in said culture bed of said container means.

9. In a hydroponics system, in combination, container means having a bottom and a culture bed extending along said bottom, said container means being adapted to have plants arranged therein wih their roots extending into said culture bed; continuous liquid supply means for providing a continuously flowing layer of nutrient solution along the bottom of said container means, said continuous liquid supply means including an intermittently operable pump and a supply tank for receiving nutrient solution from said pump and for continuously supplying the nutrient solution to said container means; intermittent liquid supply means for increasing the amount of nutrient solution supplied to said container means for intermittently raising the level of the nutrient solution therein, said intermittent liquid supply means including an overflow outlet communicating with said supply tank and said container means for intermittently supplying an increased amount of nutrient solution to said container means; and heating means for maintaining the nutrient solution at a predetermined temperature, whereby the plant roots may be discontinuously immersed in nutrient solution while a predetermined temperature is continuously maintained in said culture bed of said container means.

10. In a hydroponics system, in combination, container means having a bottom and a culture bed extending along said bottom, said container means being adapted to have plants arranged therein with their roots extending into said culture bed; continuous liquid supply means for providing a continuously flowing layer of nutrient solution along the bottom of said container means, said continuous liquid supply means including an intermittently operable pump, a supply tank for receiving nutrient solution from said pump and for continuously supplying the nutrient solution to said container means, float means in said supply tank, and electrical switch means operable by said float means for intermittently operating said pump; intermittent liquid supply means for increasing the amount of nutrient solution supplied to said container means for intermittently raising the level of the nutrient solution therein, said intermittent liquid supply means including an overflow outlet communicating with said supply tank and said container means for intermittently supplying an increased amount of nutrient solution to said container means, and time switch means for operating said pump during predetermined time periods to provide flow of said nutrient solution through said overflow outlet into said container means; and heating means for maintaining the nutrient solution at a predetermined temperature, whereby the plant roots may be discontinuously immersed in nutrient solution while a predetermined temperature is continuously maintained in said culture bed of said container means.

11. The method of supplying nutrient solution to plants having their roots arranged in a hydroponics culture bed with the bottom ends of said roots at a certain level, comprising the steps of passing in continuous flow a layer of nutrient solution having a predetermined temperature along the bottom of the culture bed; and varying the level of nutrient flowing solution between a higher level above said certain level and a lower level below said certain level for periodically immersing the plant roots in said nutrient solution and periodically leaving the roots free of contact with said continuously flowing layer of nutrient solution, so as to simultaneously discontinuously feed the plant roots while continuously maintaining a predetermined temperature in the culture bed.

12. The method of supplying nutrient solution to plants having their roots arranged in a hydroponics culture bed with the bottom ends of said roots at a certain level, comprising the steps of passing in continuous flow a layer of nutrient solution having a predetermined temperature along the bottom of the culture bed; and periodically raising the level of the layer of flowing nutrient solution from a lower level below said certain level to a higher level above said certain level for periodically immersing the plant roots in said nutrient solution and periodically leaving the roots free of contact with said flowing layer of nutrient solution, so as to simultaneously discontinuously feed the plant roots while continuously maintaining a predetermined temperature in the culture bed.

13. In a hydroponics system, in combination, container means having a bottom and a culture bed extending along said bottom, said container means being adapted to have plants arranged therein with their roots extending into said culture bed; continuous liquid supply means for providing a continuously flowing layer of nutrient solution along the bottom of said container means having a level intermittently varying between a lower level substantially beneath the roots of plants arranged in said container means and a higher level covering at least portions of said roots; and heating means for maintaining the nutrient solution at a predetermined temperature, whereby the plant roots may be discontinuously immersed in nutrient solution while a predetermined temperature is continuously maintained in said culture bed of said container means.

References Cited in the file of this patent

UNITED STATES PATENTS

| | | |
|---|---|---|
| 2,051,461 | Lee | Aug. 18, 1936 |
| 2,060,735 | Krueger | Nov. 10, 1936 |
| 2,121,461 | Widmann | June 21, 1938 |
| 2,592,976 | Thomas | Apr. 15, 1952 |
| 2,639,549 | Wubben et al. | May 26, 1953 |

FOREIGN PATENTS

| | | |
|---|---|---|
| 110,275 | Australia | Apr. 11, 1940 |
| 805,205 | Germany | May 10, 1951 |

OTHER REFERENCES

Eaton: "A Large Sand Culture Apparatus," pub. 1931 in Soil Science, vol. 31, pp. 235–251.

Ellis et al.: "Soilless Growth of Plants," 2nd ed., pub. by Reinhold (N. Y.) 1947, pp. 178–183.